Dec. 2, 1958  G. J. OAKES  2,862,440
BEVERAGE BREWING APPARATUS
Filed March 1, 1956

INVENTOR.
GLADYS J. OAKES
BY
Jennings & Carter
ATTORNEYS

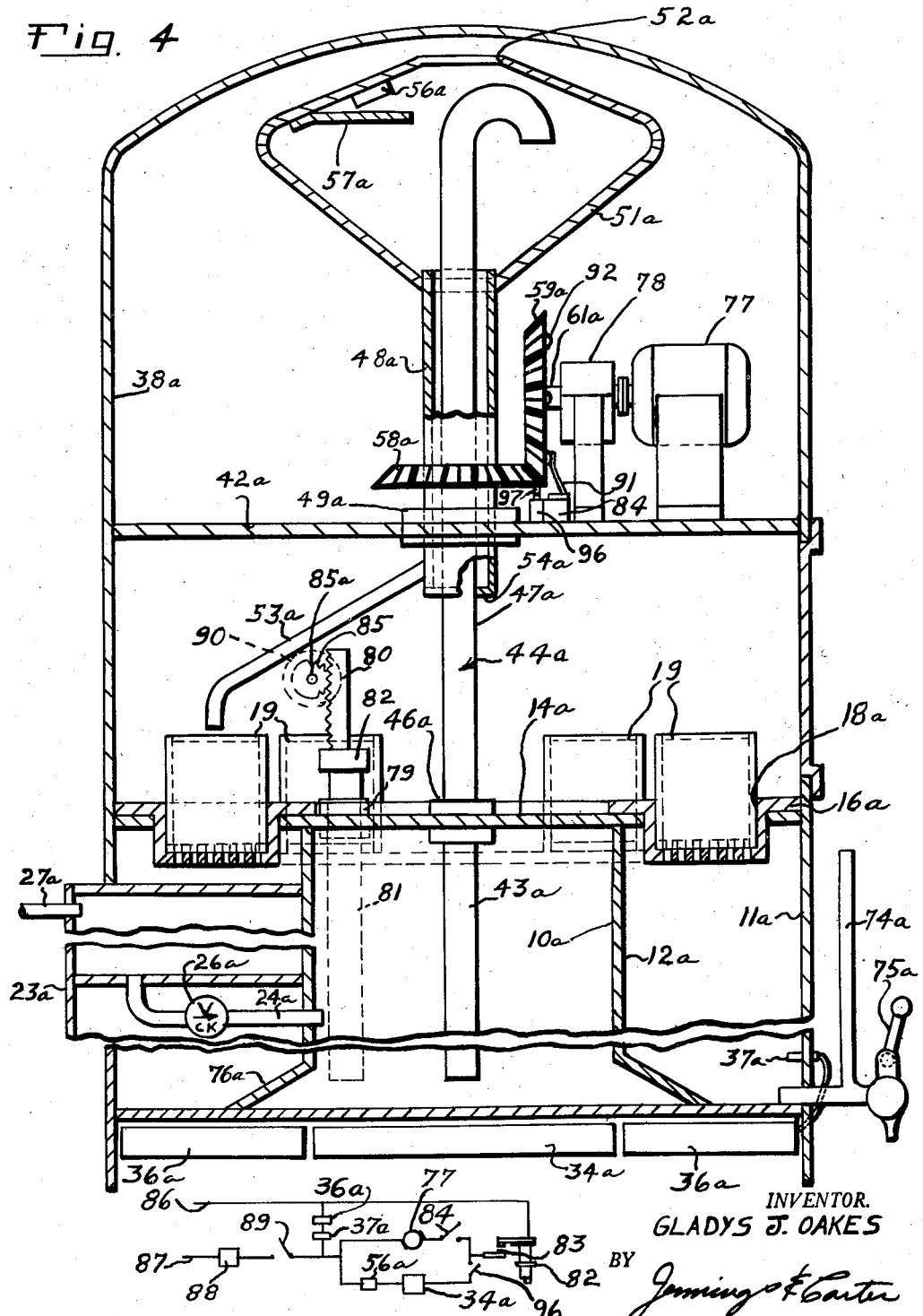

United States Patent Office 2,862,440
Patented Dec. 2, 1958

2,862,440

BEVERAGE BREWING APPARATUS

Gladys J. Oakes, Baton Rouge, La.

Application March 1, 1956, Serial No. 568,903

7 Claims. (Cl. 99—282)

This invention relates to beverage brewing apparatus which shall be adapted to produce hot, fresh beverage, such as coffee, on the drip infusion principle as required and is an improvement over the apparatus described and claimed in my co-pending application Serial No. 428,610 filed May 10, 1954 and entitled Beverage Brewing Apparatus.

An object of my invention is to provide beverage brewing apparatus which operates on the multiple batch series principle and which may be constructed of a size capacity to accommodate the brewed beverage requirement for a full day, or other desired interval of time.

A further object of my invention is to provide apparatus of the character designated which shall be adapted to produce a brewed beverage from a precisely measured quantity of water heated to a precisely controlled temperature and properly infused with a precise quantity of ground beverage.

A still further object of my invention is to provide beverage brewing apparatus of the character designated which shall be simple of construction and operation and which may be readily cleaned and operated with a minimum of effort.

My improved beverage brewing apparatus comprises a boiler positioned beneath a hot water reservoir and connected thereto by means of an evacuation tube whereby the hot water is evacuated to the reservoir when the pressure within the boiler reaches a predetermined amount. After the hot water is evacuated a precise quantity of water is introduced into the boiler. Surrounding the evacuation tube and in communication with the hot water reservoir is a sleeve member having a discharge spout at the lower end thereof whereby the water passing into the sleeve is discharged through the spout. A series of beverage containers, having perforated upper and lower ends, are so positioned that each receives water discharged from the spout when the spout is positioned thereover. The spout is rotated whereby the discharge end thereof is positioned sequentially over the beverage containers and a receptacle is positioned beneath the containers in position to receive the brewed beverage.

Apparatus embodying features of my invention is illustrated in the accompanying drawings, forming a part of this application, in which:

Fig. 4 is a vertical sectional view showing a modified form of apparatus which is automatic in operation;

Fig. 5 is a schematic wiring diagram of the circuit employed in the apparatus shown in Fig. 4; and, Fig. 6 is a fragmental, sectional view showing a modification.

Figure 2:
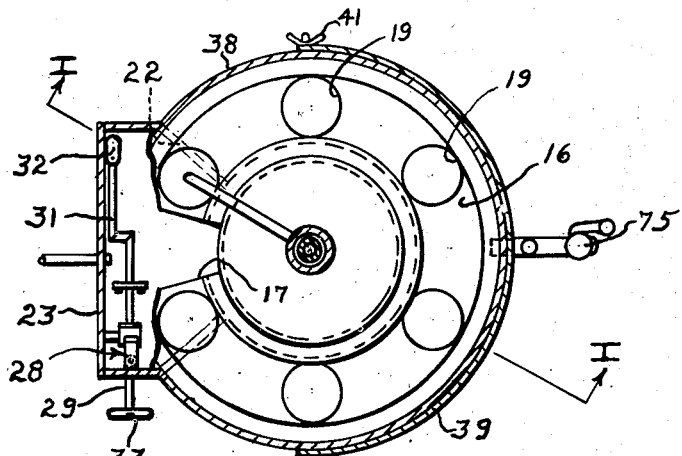
Fig. 2 is a sectional view taken generally along the line II—II of Fig. 1.

Referring now to the drawings for a better understanding of my invention I show a cylindrical boiler 10 which is substantially surrounded by a beverage receptacle 11. The boiler 10 and beverage receptacle 11 are separated by a common annular wall 12 and are provided with a bottom wall in the form of a horizontal sheet of material 13. The boiler 10 is provided with a top wall 14 and the beverage receptacle 11 is provided with a removable top wall or cover 16. As shown in Fig. 2, the removable wall 16 does not extend all the way around the boiler 10 but is provided with a cut out portion 17 at one side thereof. Annularly arranged cup shaped members 18 are provided in the removable wall 16 for receiving beverage containers 19 for holding ground beverage. The bottoms of the cup shaped members 18 are perforated as at 21 and the beverage containers 19 are provided with upper and lower perforated ends.

The beverage receptacle 11 does not extend entirely around the boiler 10 adjacent the top thereof, but is provided with a cut out segment 22, as shown in Fig. 2. Mounted within the cut-out segment 22 is a water supply tank 23 which communicates with the boiler 10 by means of a pipe 24 having a check valve 26 therein. Water is supplied to the tank 23 by means of a pipe 27. The water level in the supply tank 23 is controlled by a float actuated valve indicated generally at 28 which comprises a rotatable stem 29 having an offset portion 31 at one end thereof. Mounted at the outer end of the offset portion 31 is a float member 32. Mounted on the stem 29 outwardly of the supply tank 23 is a control knob 33 for rotating the stem 29 whereby the position of the float 32 is varied, thereby varying the amount of water which enters the tank 23. In view of the fact that the construction and operation of the float actuated valve 28 is substantially identical with that described in my copending application described heretofore, no further description thereof is deemed necessary.

Mounted beneath the boiler 10 is a high heat element 34 and mounted beneath the beverage receptacle 11 is a low heat element 36. A thermostat 37 is positioned within the receptacle 11 and is connected to the low heat element 36, whereby the contents of the receptacle 11 may be maintained at a pre-determined temperature.

Figure 1:
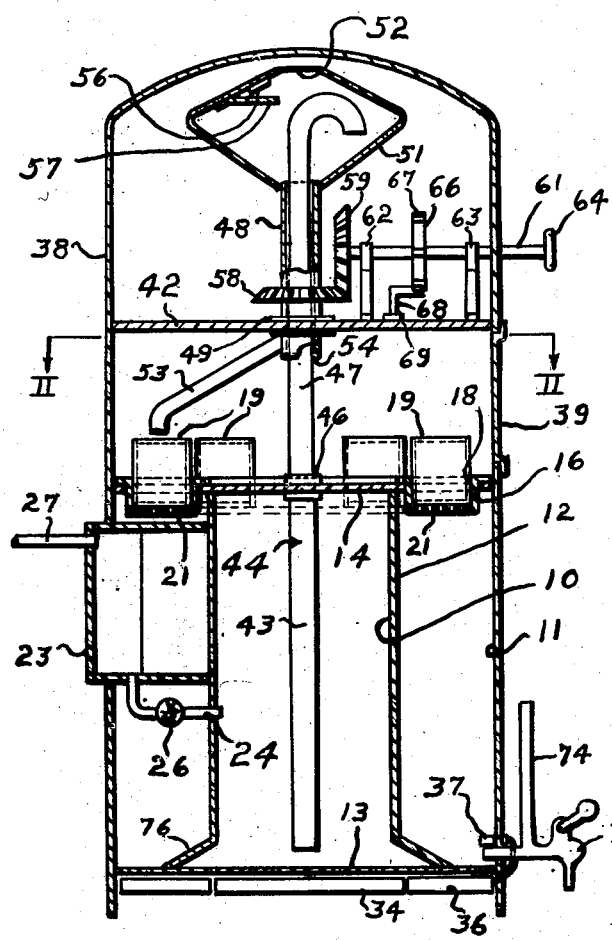
Fig. 1 is a vertical sectional view taken generally along the line I—I of Fig. 2.

Mounted on top of the boiler 10 and receptacle 11 is an upper housing 38 having a suitable access door 39 in one side thereof. The access door 39 is locked to the housing 38 by any suitable means such as wing nuts 41. Secured to and extending across the housing 38 is a horizontal plate 42. Extending upwardly through a suitable opening in the top wall 14 of the boiler 10 is a lower section 43 of an evacuation tube 44. Connected to the upper end of the lower section 43 of the evacuation tube by means of a suitable joint 46, is an upper rotatable section 47 which is preferably provided with an over bent upper end in the form of a goose-neck. As shown in Fig. 1, the upper rotatable section 47 of the evacuation tube extends upwardly through a suitable opening in the horizontal plate 42.

Surrounding the upper section 47 and in spaced relation thereto is a sleeve 48 which is mounted for rotation in a suitable bearing joint 49 provided in the horizontal plate 42. Secured rigidly to the upper end of the sleeve 48 is a reservoir 51 for receiving the hot water evacuated from the boiler 10. A suitable vent opening 52 is provided in the upper end of the reservoir 51, as shown. Secured to the lower end of the sleeve 48 and communicating with the annular space between the sleeve and the upper rotatable section 47 is a discharge spout 53. The lower end of the sleeve 48 is provided with an annular inturned flange 54 which seals the lower end of the sleeve and causes hot water entering the sleeve 48 to be discharged through the spout 53 into a subjacent beverage container 19.

A thermostat 56 is mounted in the upper portion of the reservoir 51 and is in circuit with the high heat element 34 whereby the high heat element is de-energized when the hot water in the reservoir 51 reaches the thermostat. A suitable shield 57 is preferably secured to the interior wall of the reservoir 51 beneath the thermostat 56 whereby the thermostat is not actuated until the water level reaches the same.

Figure 3:
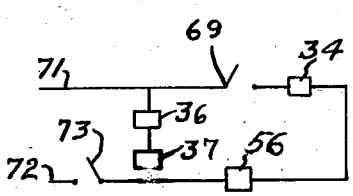
Fig. 3 is a schematic wiring diagram of the circuit employed in the apparatus shown in Figs. 1 and 2.

Keyed to the sleeve 48 is a ring bevel gear 58 which is in mesh with a second bevel gear 59 mounted on a shaft 61. The shaft 61 is mounted for rotation in suitable bearings 62 and 63 and extends through the housing 38, as shown. Mounted on the shaft 61, outwardly of the housing 38, is an actuating knob 64. Mounted on the shaft 61 inwardly of the housing 38, is a ratchet wheel 66 having teeth 67 thereon which engage a pawl 68 mounted on the horizontal plate 42. The teeth 67 are so positioned on the ratchet wheel 66 that they correspond to the relative angular positions of the beverage containers 19 and the cup shaped receptacles 18 therefor. Accordingly, by rotating the shaft 61 the outlet spout 53 is rotated until the next successive tooth 67 engages the pawl 68. At this location the spout 53 is in position to deliver hot water to the next successive beverage container 19. The pawl 68 is operatively connected to a switch 69 whereby each time a tooth 67 engages the pawl the switch 69 is closed, thereby completing the circuit to the high heat element 34, as shown in Fig. 3. Electrical power is supplied to the high and low heat elements by means of lines 71 and 72. A suitable master switch 73 is positioned in the line 72 for de-energizing the entire circuit when the apparatus is not in operation.

From the foregoing description the operation of my beverage brewing apparatus shown in Figs. 1, 2 and 3 will be readily understood. Water is introduced through the pipe 27 into the supply tank 23 where it flows by gravity through the check valve 26, and on the principle of the U-tube, charges the boiler 10 with a predetermined, precise quantity of water. Upon turning the control knob 64 until the next tooth 67 engages the pawl 68, the spout 53 is positioned directly over a beverage container 19 and the switch 69 is energized thereby completing the circuit to the high heat element 34. The water in the boiler 10 is heated to a predetermined pressure, whereupon it immediately evacuates itself through evacuation tube 44 into the hot water reservoir 51. When the hot water reaches the thermostat 56 the circuit to the high heat element 34 is de-energized by the thermostat. The hot water flows by gravity from the reservoir 51 down through the annular space defined between the sleeve 48 and the section 47 of the evacuation tube and thence is discharged through the spout 53 into a subjacent beverage container 19. The brewed beverage then passes through the perforations 21 in the removable cover 16 into the receptacle 11 where it is maintained at a predetermined temperature by means of the low heat element 36. The brewed beverage discharged from the containers 19 located over the water supply tank 23 flows off the top of the tank 23 into the receptacle 11.

A suitable spigot 75 is provided for dispensing the brewed beverage. Also, a glass water gauge 74 is provided whereby the amount of beverage remaining in the receptacle 11 is indicated. The lower portion of the annular wall 12 flares outwardly as at 76, whereby a portion of the water in boiler 10 is positioned over the low heat element 36. The water in the boiler 10 is thus preheated by the low heat element 36 prior to energizing the high heat element 34.

Immediately after the hot water is evacuated from the boiler 10 to the reservoir 51, the boiler is refilled to the predetermined level by water flowing through the check valve 26 in the manner described heretofore. As long as the boiler 10 is filled to the proper level or when there is sufficient steam pressure within the boiler 10, the check valve 26 remains closed and permits no backflow. However, when the water and pressure in boiler 10 is relieved by evacuation, the check valve 26 opens and permits the entry of a new charge of water in readiness for the next cycle of operation. In actual practice, I have found that the water is evacuated from the boiler 10 in one continuous flow at approximately 212° F. and is deposited in the water reservoir at approximately 205° F. There is no movement of water into the boiler 10 until the evacuation is complete. The new charge of water thus enters the boiler immediately upon completion of the evacuation. To repeat the cycle, the knob 64 is turned in the manner described heretofore whereupon the spout 53 moves to the next successive container 19 and the high heat element is again energized.

The apparatus may be set for any desired brew strength or the operator may vary the strength of the brew as desired by merely turning the adjustment knob 33 which varies the water level in tank 23 and boiler 10 and thus the strength of the brew.

The apparatus may be easily washed and sterilized by removing the beverage containers 19 and replacing them empty whereby they serve as funnels for conveying the water through the perforations 21 into the beverage receptacle 11. The apparatus may be thus flushed with hot water and a suitable detergent, the cleaning solution being discharged through the spigot 75. The removable cover 16 may be easily removed if mopping or scour-washing is necessary.

Referring now to Figs. 4 and 5 of the drawings, I show apparatus which operates automatically to maintain a predetermined amount of beverage in the beverage receptacle. The boiler 10a, beverage receptacle 11a and water supply tank 23a are substantially identical with the boiler 10, beverage receptacle 11 and water supply tank 23. Water is supplied to the tank 23a by means of a pipe 27a. A pipe 24a having a check valve 26a therein connects the supply tank with the boiler 10a. The boiler 10a is separated from the receptacle 11a by a vertical wall 12a which flares outwardly adjacent the lower end thereof as at 76a. A high heat element 34a is positioned beneath the boiler 10a and a low heat element 36a is positioned beneath the beverage receptacle 11a for maintaining the brewed beverage in the receptacle at a predetermined temperature. The temperature of the brewed beverage is controlled by a thermostat 37a which is operatively connected to the low heat element 36a.

Mounted over the beverage receptacle 11a is a removable cover 16a which is substantially identical in construction to the cover 16, shown in Figs. 1 and 2. The beverage containers 19 fit in cup shaped receptacles 18a whereby they form a substantially annular row as described heretofore. Extending through a suitable opening in the top wall 14a of the boiler 10a is the lower section 43a of an evacuation tube 44a. The upper section 47a of the evacuation tube is mounted for rotation in a suitable joint 46a mounted on the top wall 14a.

A housing 38a is mounted over the boiler 10a and beverage receptacle 11a and is provided with a transverse plate 42a through which the upper section 47a of the evacuation tube passes. Surrounding the upper section 47a and in spaced relation thereto is a sleeve 48a. The sleeve 48a is provided with an inturned flange 54a at its lower end which is connected to the section 47a, as shown. Surrounding the sleeve 48a and supporting the same for rotation is a coupling 49a which in turn is supported by the transverse plate 42a. A hot water reservoir 51a is mounted rigidly at the upper end of the sleeve 48a. Secured to the lower end of the sleeve 48a and in communication with the annular passageway between the sleeve and the section 47a of the evacuation tube is a discharge spout 53a. A thermostat 56a is mounted in the uppermost portion of the reservoir 51a for de-energizing the high heat element in a manner to be described hereinafter. Also, a suitable shield 57a is mounted within the reservoir beneath the thermostat to prevent operation of the thermostat before the water reaches the same. The uppermost end of the section 47a is bent over to form a goose-neck whereby the water is discharged downwardly into the reservoir. A suitable vent 52a is provided in the upper end of the reservoir, as shown.

Keyed to the sleeve 48a above the plate 42a is a ring bevel gear 58a which is in mesh with a second bevel gear 59a mounted on a shaft 61a. The shaft 61a is operatively connected to a motor 77 by means of a reduction gear box 78.

A suitable opening is provided in the top wall of the beverage receptacle 11a for receiving a bearing member 79. Mounted for sliding movement in the bearing member 79 and projecting downwardly into the beverage receptacle is the lower end of a tubular member 81 which communicates at its upper end with a pressure responsive device 82. The pressure responsive device is provided with a diaphragm whereby when the level of the beverage in the receptacle 11a drops to a predetermined level, the diaphragm closes suitable contacts 83 in the pressure responsive device which are connected in series with a switch 84 and thereby completes the electric circuit to the motor 77, as shown in Fig. 5. The contacts 83 are also connected in series with the high heat element 34a and the thermostat 56a. Power is supplied to the apparatus by means of leads 86 and 87. The predetermined level at which the pressure responsive device will close the contacts 83 can be varied by raising and lowering the tube 81 within the receptacle 11a. To raise and lower the tube 81, I mount a rack 80 at the upper end of the tube 81 which is actuated by a pinion 85 mounted on a shaft 85a. The shaft extends through the housing 38a and an operating knob 90 is mounted thereon for rotating the same.

In order to preset the apparatus for delayed initial starting, I provide a time clock 88 in circuit with the lead 87. Also, a master switch 89 is provided in the lead 87 to control the circuit to the motor and the heating elements 34a and 36a. If desirable, the low heat element 36a may be on a separate circuit whereby it may maintain the beverage at the proper temperature after the motor unit and high heat element have been cut off by the switch 89.

The switch 84 is provided with a spring element 91 which is in position to engage detents 92 on the bevel gear 59a. The detents 92 are also positioned so as to correspond to the angular position of the beverage containers 19, whereby the spring element 91 rides upon a detent 92 at the time the spout 53a is directly over the next sequential beverage container and breaks the electrical circuit to the motor 77. The motor 77 is then de-energized until the pressure responsive device 82 again completes the circuit to the motor.

From the foregoing description, the operation of my automatic brewing apparatus will be readily understood. Water is introduced into the boiler 10a and after being heated is evacuated to the hot water reservoir 51a and then flows down through the sleeve 48a to the discharge spout 53a in the manner described heretofore with respect to the operation of the apparatus disclosed in Figs. 1 to 3. To start operation, the switch 89 is closed manually or by the time clock 88 thus completing the circuit to the apparatus. With the brewed beverage below the predetermined level, the pressure responsive device 82 closes the contacts 83, thereby starting the motor 77 and energizing the circuit to the high heat element 34a. The motor 77 continues to run until the spring element 91 of the switch 84 rides upon the next detent 92 whereby the circuit to the motor 77 is broken and the spout 53a is positioned directly over the next sequential beverage container 19. The high heat element 34a remains on until the water in the boiler 10a reaches a predetermined pressure and is evacuated through the tube 44a to the hot water reservoir 51a. When the hot water reaches the thermostat 56a, the circuit to the high heat element 34a is de-energized. The low heat element 36a maintains the brewed beverage in the receptacle 11a at a predetermined temperature by means of the thermostat 37a. As long as the brewed beverage remains above a predetermined level, the apparatus remains out of operation. However, as soon as the brewed beverage drops below the predetermined level, as the result of beverage withdrawals through spigot 75a the pressure responsive device 82 closes the contacts 83 thereby repeating the cycle of operation.

The water in tank 10a is preheated by the low heat element 36a, due to the fact that the outwardly flared lower end of the wall 12a extends over a portion of the low heat element. The brewed beverage is discharged through a spigot 75a and the apparatus may be provided with the water gauge 74a to indicate the level of the brewed beverage in receptacle 11a.

While I have shown and described the heating element as being electrically operated, it will be apparent that other means may be employed for heating the boiler and the brewed beverage receptacle, such as gas or the like.

Figure 6:
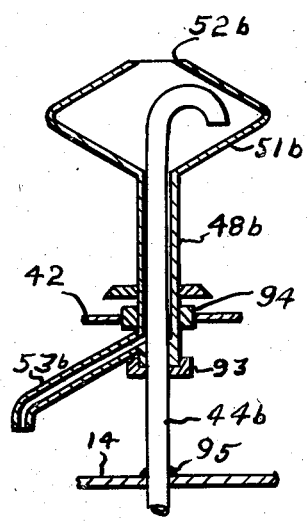

Referring now to Fig. 6 of the drawings, I show a slightly modified form of apparatus in which the evacuation tube indicated at 44b is formed of a single length of tube secured rigidly to the horizontal plate 14 by any suitable means, such as by welding at 95. Mounted on the evacuation tube 44b is a bearing support member 93 which supports a sleeve 48b for rotation in spaced relation to the evacuation tube. A hot water reservoir 51b is mounted at the upper end of the sleeve 48b and is provided with a vent opening 52b. The sleeve 48b extends upwardly through the horizontal plate 42 and is mounted for rotation in a suitable bearing member 94. Communicating with the lower end of the sleeve member 48b is a discharge spout 53b which discharges the hot water into a subjacent beverage container 19 in the manner described heretofore. The spout 53b, sleeve 48b, and hot water reservoir 51b thus rotate as a unit relative to the evacuation tube 44b. In all other respects, the operation of the apparatus shown in Fig. 6 is identical with that of the apparatus described in Figs. 1 to 5.

To stop operation of the apparatus shown in Figs. 4 and 5 after a complete series of beverage containers 19 have been utilized, I mount a switch 96 on the plate 42a in position to be actuated by a detent or finger 97 mounted on the gear 58a. The switch 96 is in circuit with the high heat element 34a, whereby upon actuation of the switch 96 by the finger 97, the circuit to the high heat element 34a is deenergized.

While I have shown the spouts 53, 53a and 53b as rotating relative to the beverage containers 19, it will be apparent that the containers 19 could be rotated relative to a stationary spout, whereby the containers 19 are registered sequentially with the spout. Also, while I show a float actuated valve in the water supply tank 23, a suitable electric water level control valve could be employed. Furthermore, disposable beverage containers or cartridges, pre-packed with ground coffee, tea or the like may be used.

From the foregoing it will be seen that I have devised improved beverage brewing apparatus which is simple of construction and operation and which is adapted to produce a brewed beverage from a precisely measured quantity of water heated to a precisely controlled temperature and properly infused with a precise quantity of prepared beverage, such as coffee or the like.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. Beverage brewing apparatus comprising a boiler, a heating element for heating said boiler, a hot water reservoir above said boiler, an evacuation tube connecting said boiler with said reservoir whereby hot water is evacuated to said reservoir when the pressure in the boiler reaches a predetermined amount, means supplying precise quantities of water to said boiler immediately after the hot water is evacuated therefrom, a sleeve surrounding said tube in spaced relation thereto and communicating at its upper end with said reservoir, a discharge spout communicating with said sleeve adjacent the lower end thereof, sealing means between the lower end of said sleeve and said tube causing hot water passing into the sleeve to be discharged through the spout, means for supporting beverage containers having perforated upper and lower ends in position for each to receive water discharged from said spout when the spout is positioned thereover, means rotating said spout to position it sequentially over said containers whereby the hot water passes sequentially through said containers, a beverage receptacle beneath said containers and in communication therewith for receiving the brewed beverage, means operable responsive to rotation of said spout to energize said heating element when the spout is positioned over a container, and means operable responsive to the height of water in said reservoir for de-energizing said heating element upon the hot water reaching a predetermined height in said reservoir.

2. Beverage brewing apparatus as defined in claim 1 in which the upper portion of said evacuation tube is mounted for rotation relative to the lower portion thereof and said upper portion and the sleeve are secured rigidly to the hot water reservoir.

3. Beverage brewing apparatus as defined in claim 1 in which the sleeve is secured rigidly to the hot water reservoir and is rotatable relative to the evacuation tube.

4. Beverage brewing apparatus comprising a boiler, a heating element for said boiler, a hot water reservoir above said boiler, an evacuation tube connecting said boiler with said reservoir whereby hot water is evacuated to said reservoir when the pressure in said boiler reaches a predetermined amount, means supplying precise quantities of water to said boiler immediately after the hot water is evacuated therefrom, a sleeve surrounding said tube in spaced relation thereto and communicating at its upper end with said reservoir, a discharge spout communicating with said sleeve adjacent the lower end thereof, sealing means between the lower end of said sleeve and said tube causing hot water passing into the sleeve to be discharged through the spout, means for supporting beverage containers having perforated upper and lower ends in position for each to receive water discharged from said spout when the spout is positioned thereover, a beverage receptacle beneath said containers and in communication therewith for receiving the brewed beverage, a motor unit operatively connected to said spout and adapted to position it sequentially over said containers whereby the hot water passes sequentially through said containers, means starting said motor unit and energizing said heating element when the beverage in the receptacle drops to a predetermined level, means stopping said motor unit when the spout is positioned over the next sequential beverage container, and means deenergizing said heating element upon evacuation of the hot water from the boiler.

5. Beverage brewing apparatus as defined in claim 4 in which the means starting the motor unit and energizing the heating element when the beverage in the receptacle drops to a pre-determined level comprises a pressure responsive device in said receptacle which is operatively connected to the motor unit and the heating element.

6. Beverage brewing apparatus comprising a boiler, a heating element for heating water in said boiler, a hot water reservoir positioned above said boiler, an evacuation tube connecting said boiler to said reservoir whereby hot water is evacuated to said reservoir from said boiler when the pressure in said boiler reaches a predetermined amount, a discharge spout communicating with the lower end of said reservoir whereby hot water is discharged through said spout from the reservoir, means for supporting beverage containers having perforated upper and lower ends in position for each to receive water discharged from said spout when the spout is positioned thereover, a beverage receptacle beneath said containers and in communication therewith for receiving the brewed beverage, a motor unit operatively connected to said spout and adapted to position it sequentially over said containers whereby the hot water passes sequentially through said containers, means starting said motor unit and energizing said heating element when the beverage in the receptacle drops to a predetermined level, means stopping said motor unit when the spout is positioned over the next sequential beverage container, and means deenergizing said heating element upon evacuation of the hot water from the boiler.

7. Beverage brewing apparatus comprising a generally cylindrical boiler, a heating element for heating water in said boiler, a hot water reservoir positioned above said boiler, an evacuation tube connecting said boiler to said reservoir whereby hot water is evacuated to said reservoir from said boiler when the pressure in said boiler reaches a predetermined amount, a sleeve surrounding said tube in spaced relation thereto and communicating at its upper end with said reservoir, a discharge spout communicating with said sleeve adjacent the lower end thereof, sealing means between the lower end of said sleeve and said tube causing hot water passing into the sleeve from the reservoir to be discharged through the spout, an annular beverage receptacle extending around the circumference of said boiler, a removable annular cover disposed over said annular beverage receptacle and having perforations therethrough, beverage containers having perforated upper and lower ends positioned on said removable cover in alignment with the perforations therein and disposed to receive water discharged from said spout when the spout is positioned thereover, means rotating said spout to position it sequentially over said containers whereby water flows through said containers into said receptacle, means operable responsive to the rotation of said spout to energize said heating element when the spout is positioned over a container, and means operable responsive to the water in said reservoir for deenergizing said heating element.

References Cited in the file of this patent

UNITED STATES PATENTS

| 855,702 | Goddard | June 4, 1907 |
| 1,068,212 | Bodascher | July 22, 1913 |
| 1,603,130 | McDuffie | Oct. 12, 1926 |
| 1,822,433 | Brand | Sept. 8, 1931 |
| 1,947,426 | Smith | Feb. 13, 1934 |
| 2,179,936 | Keene | Nov. 14, 1939 |
| 2,459,305 | Brandl | Jan. 18, 1949 |
| 2,485,246 | Swanson | Oct. 18, 1949 |
| 2,493,932 | Swanson | Jan. 10, 1950 |
| 2,568,840 | Zees | Sept. 25, 1951 |
| 2,748,689 | Rotman | June 5, 1956 |

FOREIGN PATENTS

| 15,855 | Great Britain | of 1898 |
| 433,546 | France | Oct. 30, 1911 |
| 548,160 | France | Oct. 13, 1922 |
| 292,349 | Switzerland | Nov. 2, 1953 |